No. 778,166.      Patented December 20, 1904.

UNITED STATES PATENT OFFICE.

WILHELM BIBER, OF BERLIN, GERMANY, ASSIGNOR OF ONE-HALF TO ISIDOR WIESBADER, OF NEW YORK, N. Y.

BREAD.

SPECIFICATION forming part of Letters Patent No. 778,166, dated December 20, 1904.

Application filed July 15, 1904. Serial No. 216,689.

*To all whom it may concern:*

Be it known that I, WILHELM BIBER, a citizen of the German Empire, residing at Berlin, in the German Empire, have invented certain new and useful Improvements in Bread, of which the following is a specification.

The invention to be hereinafter described relates to food products, and more particularly to bread for use as human food and the method of making the same; and the object of the invention is to provide a bread of the character referred to having capacity for remaining "fresh" for an indefinite period.

It is a well-recognized fact that the palatable and edible qualities of bread are largely dependent upon its fresh condition and the constituent elements of which it is composed. In bread made from ordinary flour the first of these qualities rapidly undergoes a change, and in the course of a few hours the bread becomes "stale," due to the fact that the moisture evaporates, leaving the bread hard and unpalatable. Any attempt to keep the bread fresh by moist surroundings results in molding and such deleterious condition that it becomes useless or unfit for human food. Likewise any material change in the constituent elements composing the bread is liable to introduce a flavoring of an undesirable nature, or the introduced constituent imparts a deleterious condition due to fermentation following the baking heat, so that where attempts have heretofore been made to employ a substance in combination with flour such substance and its manner of incorporation have been objectionable by reason of the flavor or quality of the resulting product and the low moisture-absorbing character of such substance. With these general facts in view I have found that by incorporating with the flour at some stage of its preparation a proportion or per centum of an edible non-flavoring substance having a higher degree of absorbing quality for moisture than the flour with which it is combined a bread food for human consumption may be produced that will retain its fresh or moist condition for an indefinite length of time and in which the desirable bread flavor may be maintained without change.

After long experiments I have discovered a material and preferred method of treatment which while most satisfactory from the viewpoint of a good product having the quality of preserving the fresh or moist condition of the bread and the true bread flavor is so well adapted to the practical requirements of the baker that it is capable of use under all ordinary circumstances and in all kinds of bread without special skill on the part of the workman.

As the basis of my preparation, sago, preferably in the form of ground meal or flour, is treated with water to convert it into a jelly or paste like substance, in which condition it has a high absorbing quality for moisture and is practically without flavor. This prepared sago is then mixed with a suitable quantity of flour of any usual character, the desired quantity of water and yeast being added, and the mixture then passed through the usual process of rising and preparation for the oven in the form of loaves, biscuits, rolls, &c. When properly baked, the product is found to be moist by reason of the sago jelly contained therein and will remain in this moist or fresh condition for an indefinite length of time, retaining also the unchanged and palatable flavor of the bread.

As a more definite and specific statement of the method and the proportions of the constituents entering the compound the procedure may be seen from the following illustration or example: Sago, preferably ground into meal or flour, is first treated with water at a temperature of about 108° to 116° Fahrenheit until thoroughly soaked. The surplus liquor is then poured off and suitable quantities of salt added, the whole being then stirred in boiling water in the proportion of one quart of water for each pound of sago. The mixture thus produced will present a jelly-like substance free from lumps, which when cool is ready for mixture with the flour or sponge. The subsequent operations after the sago has thus been prepared may be carried out as follows: In order to prepare a "sponge" of, say, two hundred and eighty pounds of flour, mix the flour with five gallons of water at about 72° Fahrenheit and three-fourths pound of yeast and let stand for about seven hours. Then take twenty-one pounds of sago prepared as already explained, add to it about two and a half gallons of water, preferably of a temperature of 100° Fahrenheit, and mix with the sponge, so as to bring the mixture to about 90° Fahrenheit, suitable quantities of salt being added at this stage. Break the sponge well to make a firm dough, which should be ready to handle in about one or one and a half hours. Then proceed in the usual way to make ready for the oven.

It will be understood, of course, that the above is only one of many ways that the dough may be prepared and is here given as an example merely. Thus the sago may be mixed with the flour in somewhat different proportions. The temperature and quantity of the water at the different stages may be varied somewhat, and, in fact, many changes in the sequence of steps may be made within the scope of the present invention, the essentials of which are the addition to the prepared sponge of a suitable quantity of prepared sago having a higher moisture-absorbing quality than the flour of which the sponge is formed, devoid also of substantial flavoring.

The process of making bread is not necessarily carried out in a single continued operation, as will be understood. For instance, if found more convenient, the sago may be prepared at a convenient time and place and supplied to one or more bakeries, where the successive steps of the operation are carried out—that is, prepared sago added to the prepared sponge, as hereinbefore described.

The proportion of prepared sago to the flour may be varied to some extent; but I have found that one part of sago to about ten parts of flour forms a desirable character of bread in which the moisture is maintained for a prolonged period, so that the bread remains fresh and retains the bread flavor. It is also found that the weight of the product is greater when prepared sago is used as described than would be the case if flour alone were combined with the usual bread constituents.

Having thus described my invention, what I claim, and desire to secure by Letters Patent, is—

1. The improved bread herein described containing flour and sago combined in substantially the proportions set forth whereby the bread is maintained fresh for a prolonged period.

2. The improved bread herein described capable of being kept for a prolonged period without becoming stale, containing flour and prepared sago, in substantially the proportions set forth, the prepared sago containing a higher proportion of moisture than the flour.

In testimony whereof I affix my signature in presence of two witnesses.

WILHELM BIBER.

Witnesses:
SAMUEL BIEBER,
MYER ROSENBUSH.